(No Model.)
O. B. SHALLENBERGER.
ALTERNATE CURRENT ELECTRIC MOTOR.
No. 398,458. Patented Feb. 26, 1889.
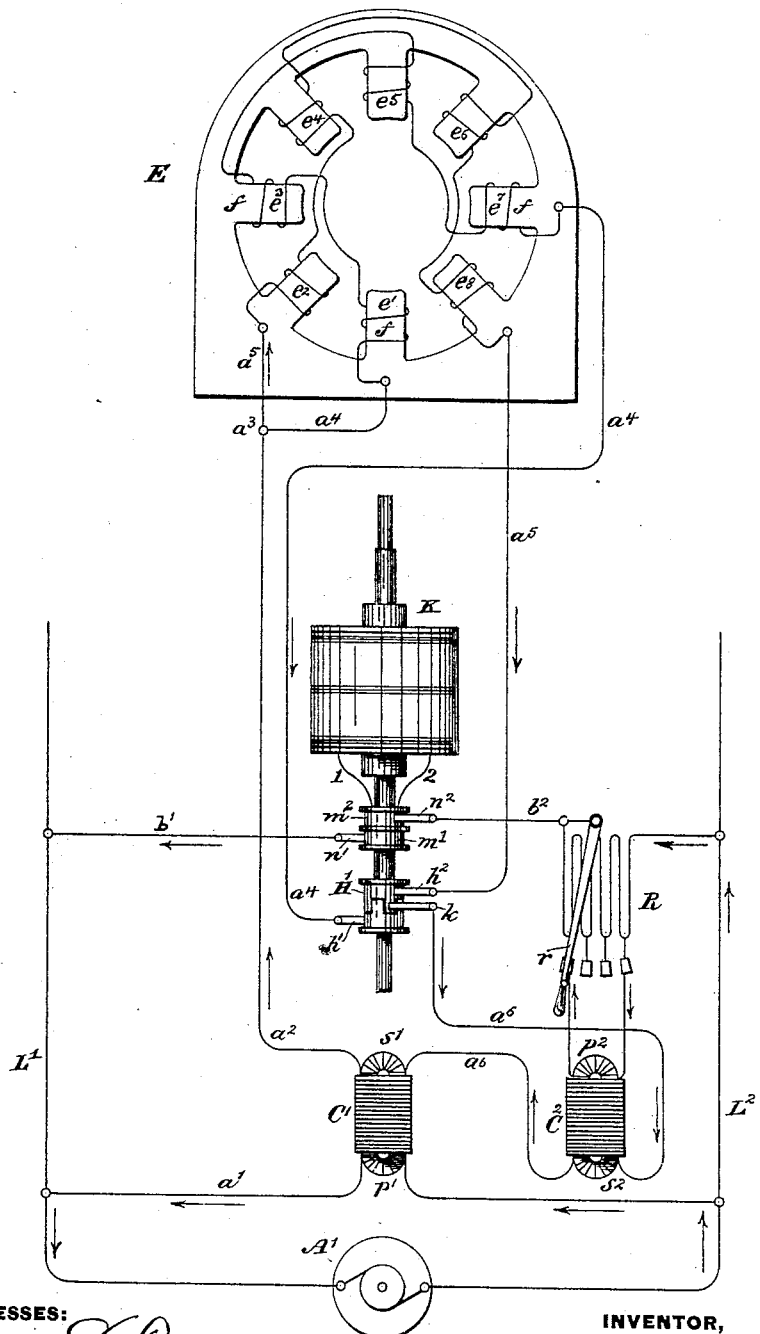
WITNESSES:
INVENTOR,
O. B. Shallenberger.
Pope Edgecomb & Terry
Att'ys.

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

ALTERNATE-CURRENT ELECTRIC MOTOR.

SPECIFICATION forming part of Letters Patent No. 398,458, dated February 26, 1889.

Application filed December 9, 1887. Renewed December 18, 1888. Serial No. 294,021. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Alternate-Current Electric Motors, (Case 170,) of which the following is a specification.

The invention relates to the class of electric motors designed to be operated by alternating electric currents, and the object is to provide a motor which will readily start from a state of rest and gradually increase its speed until it reaches a maximum, dependent upon the number of alternations per minute in the electric current.

In carrying out the invention the field-magnet is caused to be excited by currents transmitted through a suitable commutator and may conveniently be divided into two different circuits, which respectively include the coils applied to the alternate poles of the field-magnet. The magnetization of the field-magnet is carried to a very high point of saturation at the commencement and gradually decreased as the motor gradually increases its speed. To accomplish this a converter is employed for delivering secondary or induced currents to the field-magnet circuit, and the effect of this converter may be varied, so as to apply a higher or lower electro-motive force to the field, as may be required. Two converters may be used, one of which maintains a suitable potential for the field-magnets when the motor has reached a proper speed, the other being so connected as to add its effect to the first before that speed is reached. The adjustment of the electro-motive force of the second converter may be effected in various ways, and among others by varying the difference of potential on its primary coil by means of a resistance in shunt thereto. The latter resistance may be also connected in series with the armature, and when so connected its gradual reduction increases the armature-current, and at the same time decreases the difference of potential on the field-magnet until it is reduced to that of the first converter.

In a certain other application filed by me January 23, 1888, Serial No. 264,468, the method of operation herein set forth is claimed.

In the accompanying drawing there is shown a general organization of circuits and apparatus for carrying out the invention.

Referring to the figure, A' represents a suitable source of alternating electric currents. Conductors L' and L² are led from the respective poles of this generator. In the conductor $a'$, leading from the conductor L' to the conductor L², there is included the primary coil $p'$ of a converter, C'. The secondary coil $s'$ of this converter is connected at one terminal with a conductor, $a^2$, leading to the field-magnet coils of the motor. The conductor $a^2$ divides at a point, $a^3$, into branches $a^4$ and $a^5$. The branch $a^4$ leads through the coils $e'$, $e^3$, $e^5$, and $e^7$, which alternate in position with the coils $e^2$, $e^4$, $e^6$, and $e^8$. These are applied to the alternate poles $f$ of the field-magnet E of the motor. The coils $e^2$, $e^4$, &c., are included in the branch conductor $a^5$. The conductor $a^4$, leading from the field-magnet, is connected with a brush, $h'$, applied to a circuit-changing commutator, H', upon the shaft of the armature K of the motor.

The conductor $a^5$, leading from the field-magnet, is connected with a corresponding brush, $h^2$, applied to the commutator. A brush, $k$, applied to the commutator H, makes alternate contact with the plates against which the brushes $h'$ and $h^2$ respectively rest. This brush $k$ is connected by a conductor, $a^6$, through the secondary coil $s^2$ of a converter, C², thence back to the remaining terminal of the secondary coil $s'$ of the converter C'. It will be seen thus that the secondary circuits of the converters C' and C² are completed alternately through the conductors $a^4$ and $a^5$, thus causing the poles of the field-magnet to be alternately vitalized.

The primary circuit of the converter C² is connected in a shunt upon a resistance, R, included in a conductor, $b^2$, leading from the line L² to a contact-brush, $n^3$, applied to the contact-ring $m^2$ upon the armature of the motor. A second ring, $m'$, upon this shaft, is provided with a second brush, $n'$, which is connected by a line, $b'$, with the line L'. The rings $m'$ and $m^2$ are respectively connected with the terminals 1 and 2 of the armature-coils. More or less of the resistance R may be included between the terminals of the primary coils $p^2$ of the converter $C^2$ by means of a lever, $r$, or in any other convenient manner. When the machine is to be started, the resistance R is included in shunt upon the converter $C^2$, so that the maximum difference of potential is applied to the coil $p^2$, the current induced in the secondary coil $s^2$ is added to the current, which is being induced at the same time in the secondary coil $s'$ of the converter $C'$, and the combined currents serve to raise the field-magnet E to a point of high saturation. The armature is meanwhile supplied with currents through the conductors $b'$ and $b^2$. As the rotation of the armature increases in rapidity, the resistance may be gradually cut out, and this will cause the difference of potential at the terminals of the primary coil $p^2$ to be diminished, and consequently the effect of the coil will be diminished until finally, when the resistance R has been completely short-circuited, the converter has no further effect. The converter $C'$ then operates alone at a proper electro-motive force to maintain the field at its proper value. The speed of the armature has meanwhile been increasing until it has reached synchronism with the alterations of current upon the circuit, and consequently the successive currents through the alternate field-magnet coils will be in the same direction, and the motor is then working under proper conditions.

I claim as my invention—

1. The combination, with the field-magnet of an electric motor and a source of current therefor, of a converter having its primary coil supplied with alternating electric currents and its secondary coil connected to assist the field-magnet current, and means for supplying more or less current to the primary coil of the converter.

2. The combination, with the field-magnet coils of an electric motor, of a converter having its secondary circuit connected through said coils, a second converter assisting in effect the first-named converter, and connections through the armature of the motor independent of the field-magnet connections.

3. The combination, with the field-magnet coils of an electric motor, of a converter having its secondary circuit connected through said coils, a second converter assisting in effect the first-named converter, connections through the armature of the motor independent of the field-magnet connections, and means for cutting the primary coil of the second converter out of circuit.

4. The combination, with the field-magnet coils of an electric motor and the armature applied thereto, of a converter supplying currents to the field-magnet coils, a circuit-transferring commutator through which the secondary circuit of said converter is completed, an artificial resistance included in the circuit of the armature, means for including more or less of said resistance in circuit, and a second converter having its primary coil connected in shunt upon said resistance and its secondary coil in series with the secondary coil of the first-named converter, substantially as described.

5. The combination, with the field-magnet of an electric motor having multiple poles, of branch conductors including the coils applied to the alternate poles, a commutator upon the armature-shaft of the motor, means for completing the circuit-connections through said branch circuits alternately, and a source of alternating electric currents supplying said branch circuits.

In testimony whereof I have hereunto subscribed my name this 18th day of November, A. D. 1887.

OLIVER B. SHALLENBERGER.

Witnesses:
REGINALD BELFIELD,
W. D. UPDEGRAFF.